(12) United States Patent
Lapic et al.

(10) Patent No.: US 12,744,737 B2
(45) **Date of Patent: *Sep. 22, 2026**

(54) TRAFFIC CONTROL IN A COMMUNICATION NETWORK

(71) Applicant: ZIPWHIP, LLC, San Francisco, CA (US)

(72) Inventors: James Lapic, Kirkland, WA (US); Bradley Robert Biltz, Fletcher, NC (US); Alison Billings, Seattle, WA (US); Joel David Niemeyer, Seattle, WA (US)

(73) Assignee: ZIPWHIP, LLC, San Francisco, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 18/760,273

(22) Filed: Jul. 1, 2024

(65) Prior Publication Data

US 2024/0356856 A1 Oct. 24, 2024

Related U.S. Application Data

(63) Continuation of application No. 18/195,092, filed on May 9, 2023, now Pat. No. 12,081,441, which is a (Continued)

(51) Int. Cl.
*H04L 47/24* (2022.01)
*H04L 41/50* (2022.01)
(Continued)

(52) U.S. Cl.
CPC .......... *H04L 47/24* (2013.01); *H04L 41/5022* (2013.01); *H04L 41/5093* (2013.01);
(Continued)

(58) Field of Classification Search
CPC .................... H04L 41/00; H04L 41/08; H04L 41/084–0846; H04L 41/0894;
(Continued)

(56) References Cited

U.S. PATENT DOCUMENTS 8,819,819 B1 8/2014 Johnston et al.
9,177,293 B1 11/2015 Gagnon et al.
(Continued)

FOREIGN PATENT DOCUMENTS

WO 2005081109 A1 9/2005

*Primary Examiner* — Boris D Grijalva Lobos
(74) *Attorney, Agent, or Firm* — Lowenstein Sandler LLP

(57) ABSTRACT

An example method of traffic control in a communication network includes the operations of: receiving, by a processing device, a message associated with a communication address of a party originating the message; determining a class of service associated with the communication address; identifying a network resource locator contained in the message; responsive to detecting, in a chain of redirects associated with the network resource locator, an identifier of a related entity represented by one of: a trusted entity or a known bad actor, adjusting the class of service based on the related entity; selecting one or more links having their respective reliabilities corresponding to the adjusted class of service; and forwarding the message via the one or more links.

17 Claims, 6 Drawing Sheets

Related U.S. Application Data continuation of application No. 17/357,752, filed on Jun. 24, 2021, now Pat. No. 11,695,701.

(51) Int. Cl.

| | |
|---|---|
| ***H04L 41/5022*** | (2022.01) |
| ***H04L 47/80*** | (2022.01) |
| ***H04L 51/212*** | (2022.01) |
| ***H04L 51/226*** | (2022.01) |

(52) U.S. Cl.

CPC .......... *H04L 47/805* (2013.01); *H04L 51/212* (2022.05); *H04L 51/226* (2022.05)

(58) Field of Classification Search

CPC ..... H04L 41/16; H04L 41/50; H04L 41/5003; H04L 41/5019–5025; H04L 41/5061; H04L 41/5067; H04L 41/507; H04L 41/508; H04L 41/5093; H04L 47/00; H04L 47/10; H04L 47/24; H04L 47/2458; H04L 47/70; H04L 47/80; H04L 47/805; H04L 51/00; H04L 51/21; H04L 51/212; H04L 51/226

See application file for complete search history.

(56) References Cited

U.S. PATENT DOCUMENTS

| | | | |
|---|---|---|---|
| 10,075,417 | B2 | 9/2018 | Baughman et al. |
| 10,334,050 | B2 | 6/2019 | Kentley-Klay et al. |
| 10,705,856 | B2 | 7/2020 | Irani et al. |
| 10,761,839 | B1 | 9/2020 | Migoya et al. |
| 2009/0182818 | A1 | 7/2009 | Krywaniuk |
| 2010/0095377 | A1 | 4/2010 | Krywaniuk |
| 2012/0314677 | A1 | 12/2012 | Gilder |
| 2014/0373145 | A1 | 12/2014 | Wardman et al. |
| 2015/0180791 | A1 | 6/2015 | Bentley et al. |
| 2015/0188829 | A1 | 7/2015 | Satpathy et al. |
| 2016/0094566 | A1 | 3/2016 | Parekh |
| 2016/0285804 | A1* | 9/2016 | Mankovskii .......... H04L 51/212 |
| 2017/0111375 | A1 | 4/2017 | Provos et al. |
| 2017/0230323 | A1 | 8/2017 | Jakobsson |
| 2020/0067861 | A1 | 2/2020 | Leddy et al. |
| 2020/0257853 | A1 | 8/2020 | Hussain et al. |
| 2020/0311154 | A1 | 10/2020 | Turner et al. |
| 2020/0387398 | A1 | 12/2020 | Xia |
| 2023/0283632 | A1 | 9/2023 | Jursa et al. |

* cited by examiner

TRAFFIC CONTROL IN A COMMUNICATION NETWORK

RELATED APPLICATIONS

This application is a continuation of U.S. patent application Ser. No. 18/195,092 filed on May 9, 2023, which is a continuation of U.S. patent application Ser. No. 17/357,752 filed on Jun. 24, 2021 and issued as U.S. Pat. No. 11,695,701 on Jun. 14, 2023. Both above-identified applications are incorporated by reference herein.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
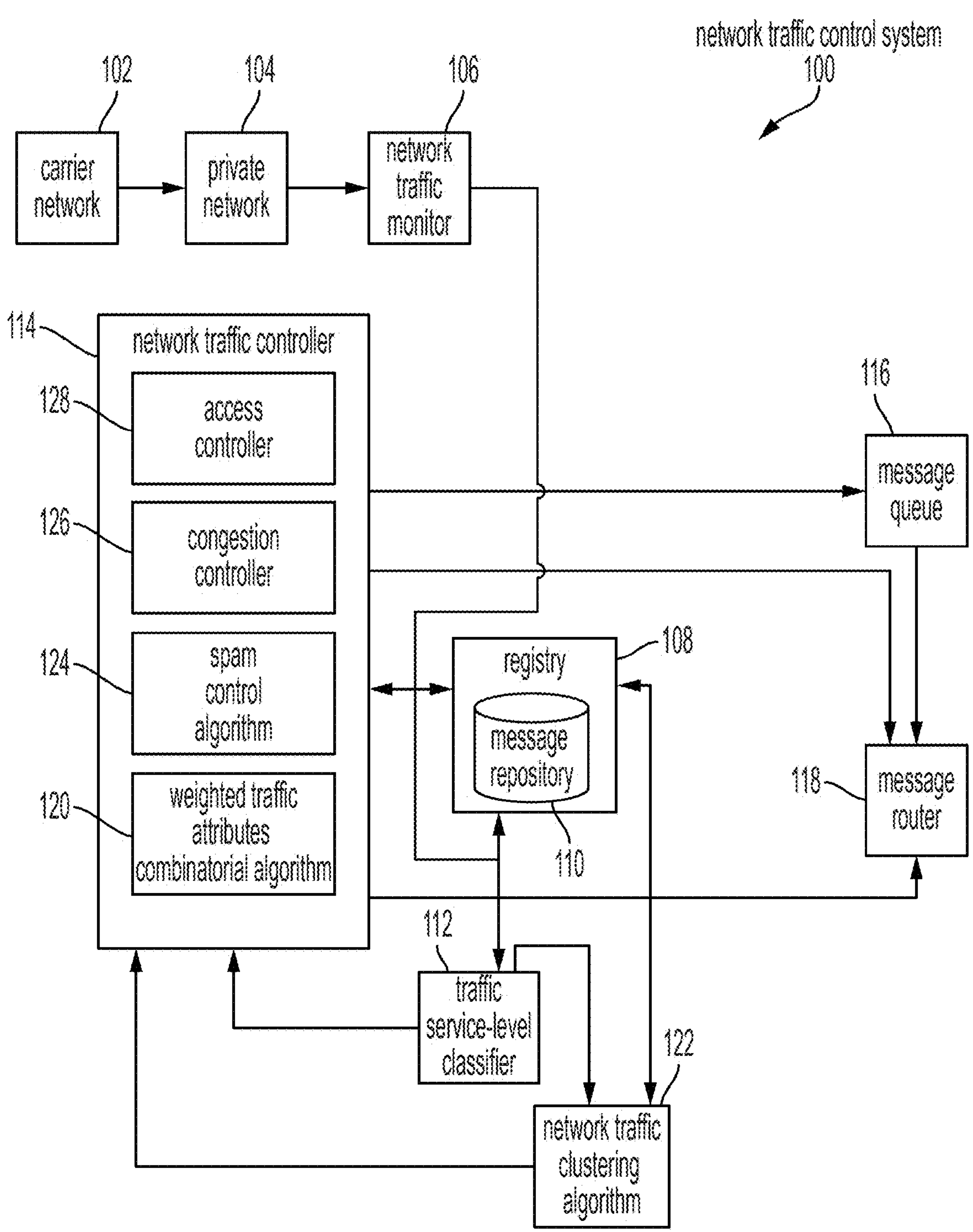
FIG. 1 depicts a network traffic control system 100 in accordance with one embodiment.

FIG. 1 depicts a network traffic control system 100 in one embodiment. Messages from a carrier network 102 pass to a private network 104 where they are processed by a network traffic monitor 106 that senses messages on the carrier network 102. The sensed messages are stored in a registry 108 (e.g., a relational database), stored in a message repository 110, and also provided to a traffic service-level classifier 112 and a network traffic controller 114.

Outputs of the traffic service-level classifier 112 are applied to and utilized by the network traffic controller 114 to generate control signals and/or messages to a message queue 116 and a message router 118 that receives and routes messages from the message queue 116.

In overview, the traffic service-level classifier 112 receives one or more messages comprising an communication address from which the messages originated. The traffic service-level classifier 112 is configured with various algorithms, including possibly machine learning, to determine a class of service for the network traffic controller to utilize for the communication address based at least in part on messages originating from different communication addresses configured in the registry 108.

The system includes logic responsive to the class of service from the traffic service-level classifier to trigger a reactive address verification on condition that the class of service is a restricted communication address class. This logic may be disposed in the network traffic controller 114, the registry 108, the traffic service-level classifier 112, or may be separate logic from these components. On condition that the reactive address verification process 202 succeeds in verifying the communication address 204, one of the network traffic controller 114 and the traffic service-level classifier 112 elevate the class of service of the communication address 204 to a verified communication address class in the registry 108. The network traffic controller 114 responds to elevation of the communication address 204 to the verified communication address class to apply one or more of higher queue priority, enhanced functionality, and reduced spam filter aggression to the communication address as compared to messages from communication addresses assigned a restricted communication address class.

Figure 2:
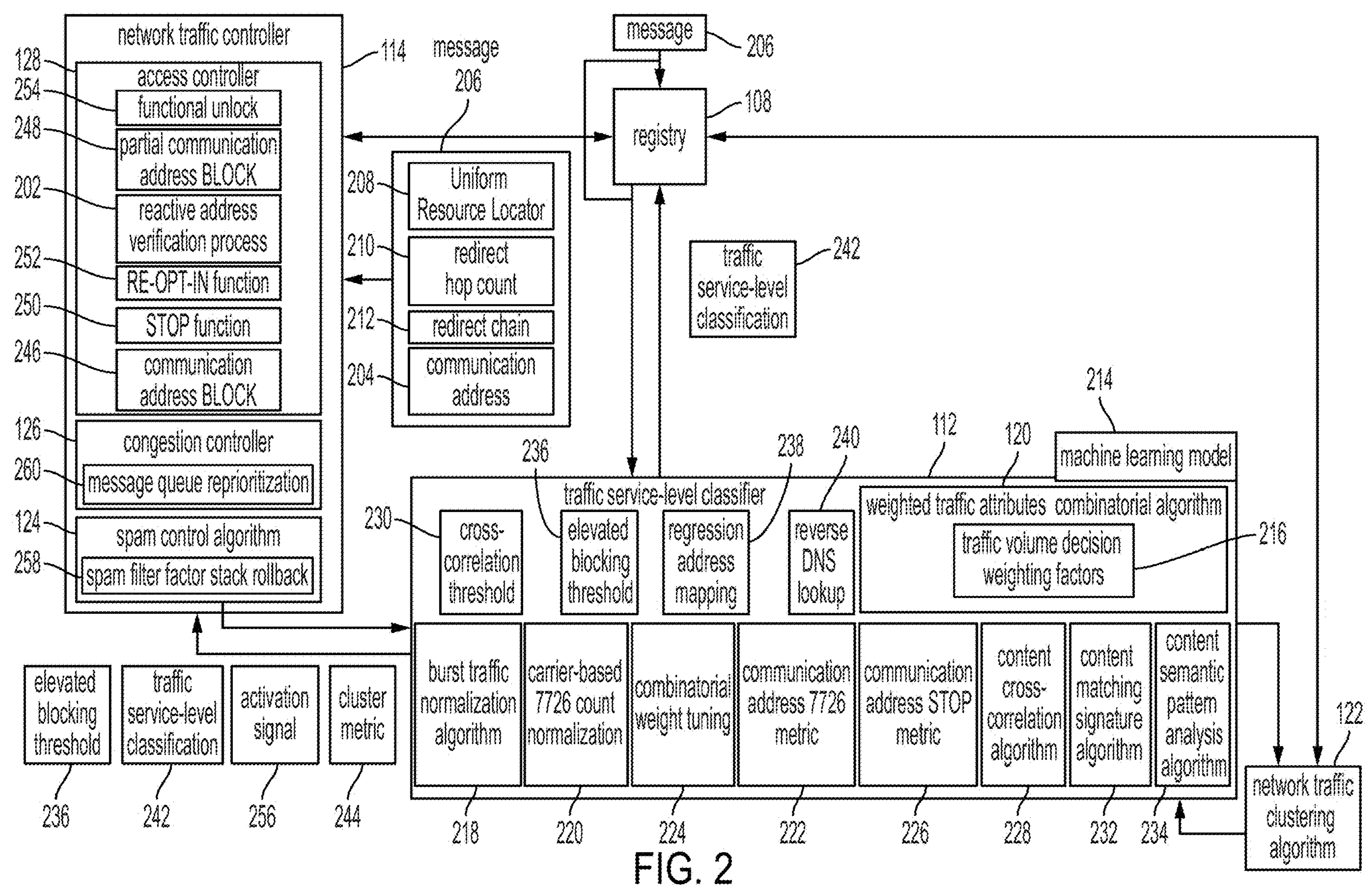
FIG. 2 depicts additional aspects of the network traffic control system 100 in accordance with one embodiment.

FIG. 2 depicts additional aspects of the network traffic control system 100 in one embodiment.

A message 206 such as an Short Message Service (SMS), MMS (Multimedia Message Service), or email is stored in the registry 108 (e.g., in the message repository 110, which may be included in or separate from the registry 108) and also passed to the traffic service-level classifier 112 and the network traffic controller 114. The message 206 may comprise one or more Uniform Resource Locator 208, redirect hop count 210, redirect chain 212, and communication address 204, as well as text or media, in the body and/or header of the message.

The traffic service-level classifier 112 applies various algorithms to the content of the body and/or header of the message 206. These algorithms may include the weighted traffic attributes combinatorial algorithm 120 which applies user-configured or learned (e.g., by one or more machine learning models 214) traffic volume decision weighting factors 216 to combine outputs of various other of the algorithms of the traffic service-level classifier 112, for example into a weighted average or weighted sum metric:

$$L = \sigma \sum_i a_i b_i$$

where δ is an coefficient for enhancing or attenuating overall, averaging etc., $b_i$ is a metric generated by one of the algorithms of the weighted traffic attributes combinatorial algorithm 120, and ai is a weighting factor for metric $b_i$. The index i may range over some or all of the metrics generated by the algorithms of the weighted traffic attributes combinatorial algorithm 120.

The various algorithms that may be utilized in the traffic service-level classifier 112 include a burst traffic normalization algorithm 218, carrier-based 7726 count normalization 220 and communication address 7726 metric 222, combinatorial weight tuning 224, communication address STOP metric 226, content cross-correlation algorithm 228 and cross-correlation threshold 230, content matching signature algorithm 232, content semantic pattern analysis algorithm 234, elevated blocking threshold 236, regression address mapping 238, and reverse DNS lookup 240. In addition to providing one or more results to the weighted traffic attributes combinatorial algorithm 120, the algorithms of the traffic service-level classifier 112 utilizes one or more of the algorithm results to generate a traffic service-level classification 242 that is applied to and utilized by the network traffic controller 114, for example by associating ranges of values of output by the weighted traffic attributes combinatorial algorithm 120 with discrete classes of service.

The traffic service-level classifier 112 also may utilize a network traffic clustering algorithm 122 to identify cluster metrics 244 for network traffic having common or similar attributes. Network traffic cluster metrics 244 may also be applied to and utilized directly by the network traffic controller 114. The network traffic clustering algorithm 122 may generate clustering metrics stored in the registry 108 and/or utilized by any of the algorithms of the traffic service-level classifier 112 in addition to or in place of attributes for a single message 206.

Within the network traffic controller 114, the spam control algorithms 124 operate on the message 206 to provide metrics indicative of spam communications. The operation and configuration of the spam control algorithms 124 may be influenced by the traffic service-level classification 242 generated by the traffic service-level classifier 112 in manners described in more detail below.

The congestion controller 126 may also utilize the traffic service-level classification 242 to prioritize the message 206 or other messages on the carrier network 102 when conditions determined by the network traffic monitor 106 indicate burst or congestion status to be present or imminent.

The access controller 128 may comprise logic to perform a communication address BLOCK 246 or partial communication address BLOCK 248, STOP function 250 (to customize opt-out message responses to some or all recipients of messages from a particular entity), RE-OPT-IN function 252 (to enable recipients that have opted out to opt back into messages from the sender of the message 206), reactive address verification process 202, and/or functional unlock 254 of one or more of these control functions. These actions by the access controller 128 may be unlocked (made available) as functionality available to the message 206 according to the class of service for the sender/message 206 determined by the traffic service-level classifier 112.

Certain of the algorithms may be invoked to classify messages from addresses of unverified origin as either restricted, verified, or trusted status messages. A common scenario in which this may take place is when a communication address such as a phone number originates through a reseller of services on the private network 104, in which case the communication address may not have a record entry in the registry 108 that provides sufficient ancillary settings to ascertain with confidence the entity (human or organization) that controls or originates communications from the communication address. Messages comprising such attributes may be initially classified by the traffic service-level classifier 112 with a restricted status.

Another common scenario is when a communication address has previously been classified as verified status, meaning the originating entity is known and ancillary settings about the communication address in the registry 108 provide confidence the originating entity does not violate configured rules (e.g., in the registry or in the network traffic controller 114) for communication on the carrier network 102 and/or private network 104. Messages previously classified as verified status may be re-classified as restricted status based on determination made on one or more of their messages by the traffic service-level classifier 112 and/or spam control algorithms 124. Likewise messages from entities that have the highest class of service, trusted status, may be downgraded to verified or even restricted status if too many violations of good messaging behavior are detected.

In one embodiment a reactive address verification process 202 may be activated by the access controller 128 of the network traffic controller 114 based on signals from the traffic service-level classifier 112. For example, the weighted traffic attributes combinatorial algorithm 120 may generate such one or more activation signals 256 based on a weighted average or sum of outputs from one or more of a burst traffic normalization algorithm 218, content cross-correlation algorithm 228 and cross-correlation threshold 230, content matching signature algorithm 232, content semantic pattern analysis algorithm 234, elevated blocking threshold 236, regression address mapping 238, spam control algorithms 124, network traffic clustering algorithm 122, and reverse DNS lookup 240. One or more of these algorithms may also identify communication addresses that may be related to (originating from a commonly controlled source entity) a communication address. A failure of the originating entity to respond to and meet conditions of the reactive address verification process 202 may result in activation of the communication address BLOCK 246 or partial communication address BLOCK 248 (some but not all messages from the communication address 204 are blocked) function on the communication address and potentially also on some or all of the related communication addresses.

In one embodiment the reactive address verification process 202 collects information from the originating entity or their agent using one or more online forms. The nature of the information collected may correspond to one or more of the outputs generated by the various algorithms of the traffic service-level classifier 112 (e.g., classification i.e. Use case of the message content-'marketing', 'support', 'scheduling' etc.) as well as name, contact phone number, website, migrated or original status (e.g., were the messages from a previously establish service migrating from another provider), and address information about the originating entity.

The various spam control algorithms 124 that may be utilized for SMS, EMS, email, chat and so on are well known and understood and need not be elaborated further. In one embodiment, the set of spam control algorithms 124, which may also comprise virus scanners, that are activated on a particular message is responsive to the communication address status of the message. The full stack (plurality of spam control algorithms, some of which may interact with one another) may be activated on restricted communication addresses, whereas some spam control algorithms of the full stack may be deactivated for communication addresses elevated to verified communication address status, and still more of the full stack deactivated for communication addresses elevated to trusted communication address status. Promotion of a communication address from restricted to verified status, or from verified status to trusted status, may trigger the network traffic controller 114, e.g., via the access controller 128, to provide the communication address 204 associated with the message 206 with an elevated blocking threshold 236, meaning that the level of undesirable/unauthorized message activity that would trigger a block on communications from the communication address 204 for lower-level status are not activated for the communication address 204. However such activity, as detected by the traffic service-level classifier 112 and/or spam control algorithms 124, that exceeds the elevated blocking threshold 236, may still trigger a block on the communication address 204.

In the algorithm descriptions below, it should be understood that any attributes of a message operated on by the algorithms may be supplemented or substituted by attributes of network traffic clusters.

The content cross-correlation algorithm 228 and content semantic pattern analysis algorithm 234 may operate on the body and/or headers of the message 206 and other messages stored in the registry 108 or another repository/database, to identify correlation in semantic structure, word or phrase usage, formatting, and other indices of similarity and correlation. If the similarity/correlation meets a cross-correlation threshold 230, a restricted communication address of the message 206 may by promoted to a verified communication address, due to being sufficiently correlated with a different, but verified or trusted, communication address. An exemplary algorithm is:

$$\kappa = \alpha(\text{similarity metric}) + \beta(\text{cross} - \text{correlation metric})$$

Here α and β are weighting factors on the similarity metric generated by the content semantic pattern analysis algorithm 234 and the content cross-correlation algorithm 228, respectively. The composite metric K may be provided to the weighted traffic attributes combinatorial algorithm 120 for utilization along with other metrics generated by the algorithms in the traffic service-level classifier 112.

Various content cross-correlation algorithms 228 that may be utilized to analyze spatial and series correlations in message bodies and headers are well known and understood. Those of skill in the art will readily appreciate that convolution and autocorrelation (e.g., to identify repetitive patterns) may also or alternatively be utilized on messages in some cases. Likewise various content semantic pattern analysis algorithm 234 that may be utilized on message bodies and/or headers to identify similarities in semantics, word and phrase usage, etc. are well known and understood, for example rule-based algorithms, semantic labeling algorithms, lexicon-based algorithms, Markov Blanket algorithms, Support Vector Machine algorithms, graph-based algorithms, LSA-based algorithms, weakly and semi-supervised classification using machine learning models 214, random walk algorithms, ranking algorithms, random-forest algorithms, statistical algorithms, and so on.

Digital content matching signature algorithms 232 include so-called "fingerprinting" algorithms that map longer content (comprising more symbols or higher entropy, for example) to a typically much shorter/lower entropy bit string that provides an indicia of identification as to source of the content, for example. Well known and understood examples of content matching signature algorithms 232 include Rabin's Algorithm and cryptographic hashing algorithms. Such algorithms may be utilized to find sufficient commonality between the message 206 and stored messages such that a common source may be identified for service level classification of message 206, especially messages from restricted communication addresses. The signature/fingerprint may in some embodiments be generated from content of the message 206 that is auto-generated by a machine, such as a point-of-sale machine, an autoreply or sender signature block, or a Uniform Resource Locator 208 in the message. In some embodiments the metric generated by the content matching signature algorithm 232 may be utilized in the combined metric provided to the weighted traffic attributes combinatorial algorithm 120 such that $$\kappa = \alpha(\text{similarity metric}) + \beta(\text{cross} - \text{correlation metric}) + \gamma(\text{signature metric})$$

In some cases the weight y of the signature metric may be set much higher than α and β, or may be applied independently or in place of the similarity metric and/or cross-correlation metric in the weighted traffic attributes combinatorial algorithm 120.

The traffic service-level classifier 112 may execute a reverse DNS lookup 240 on one or more IP address and/or Uniform Resource Locator 208 in the body or header of the message 206 in order to identify a domain name associated with an entity that owns/registered the domain. The traffic service-level classifier 112 may then identify the same owner/entity in the registry 108 and assign that entity's class of service status to the communication address 204. A length of time since registration and live status, and traffic metrics for the ascertained URL may also be utilized in some cases to determine a weight value to assign, via combinatorial weight tuning 224, to the outputs of the reverse DNS lookup 240 in the weighted traffic attributes combinatorial algorithm 120. Carriers or other third parties may be given access in the network traffic control system 100 to set or adjust the weights via the combinatorial weight tuning 224.

Other factors that may influence the combinatorial weight tuning 224 are a redirect chain 212 and redirect hop count 210 for any Uniform Resource Locators 208 in the message 206. For example the traffic service-level classifier 112 may follows one or more Uniform Resource Locators 208 through a chain of redirects and determine that either (1) one or more domains in the chain is associated with a trusted or verified status entity, (2) a known bad actor on the carrier network 102 or private network 104, or (3) neither of these.

The traffic service-level classifier 112 may also utilize regression address mapping 238 on the communication address 204 to generate a metric of association with a known (in the registry 108) communication address and hence a class of service (restricted, verified, trusted, or intermediate classes thereof). Logistic regression may be utilized by the 238 to generate a metric of the relationship between the a dependent variable (the communication address 204) and one or more independent variables (previously classified communication addresses) by estimating probabilities using a logistic function, in manners well known and understood in the art. In some cases, the regression address mapping 238 may follow the addresses in a header of the message 206 back to a source or intermediate address that is associated with an established class of service in the registry 108, thus establishing a class of service for the message 206 by association.

As noted above, any one metric of the algorithms of the traffic service-level classifier 112, or the combined metric of the weighted traffic attributes combinatorial algorithm 120, may not meet a configured threshold in which case the reactive address verification process 202 may be triggered in the network traffic controller 114, or the depth and aggressiveness settings of spam filters in the spam filter algorithm stack. Alternatively a promotion to a higher class of service may result in a spam filter stack rollback 258 such that certain spam control algorithms of the stack are deactivated or set to a less aggressive mode of operation. An elevated blocking threshold 236 for a communication address BLOCK may also be activated based on promotion/elevation to the higher class of service.

Based on the ascertained class of service for the message 206, the congestion controller 126 may perform a message queue reprioritization 260 to raise or lower the outbound priority of messages in the message queue 116 (which may in some embodiments be implemented as multiple queues, for example one queue for each class of service). The congestion controller 126 may in some embodiments configure the message router 118 to route higher status (trusted, verified) messages onto less congested and/or more reliable links.

In some embodiments, entities communicating on the private network 104 and/or carrier network 102 may be subject to a traffic-based earn-up classification, meaning that because of a history and/or volume of well-behaved communication (as recorded in the registry 108 or another repository) the class of service for their traffic is automatically raised by the traffic service-level classifier 112 without necessarily invoking the proactive address verification process.

The traffic service-level classifier 112 may comprise logic to ascertain a communication address 7726 metric 222 for entities communicating on the carrier network 102 and/or private network 104. When a recipient receives a potential spam text message on a phone, they may forward that message to the shortcode 7726 (which spells "SPAM"). The recipient then receive an automated message from their wireless carrier, prompting them to enter and send a message including the phone number (which functions as a communication address) from which the spam text was sent. The traffic service-level classifier 112 may detect these recipient response messages, or the original 7726 complaint message, and may formulate the communication address 7726 metric 222 by accumulating a count or maintaining a normalized metric of such messages against particular entities or communication addresses. A normalized metric may be generated by the carrier-based 7726 count normalization 220 algorithm. An exemplary carrier-based 7726 count normalization 220 in one embodiment is:

$$M = \frac{1}{\varepsilon} \times \frac{N_c}{N_s}$$

where M is the determined communication address 7726 metric 222 for a particular communication address, ε is the carrier network market share (as a fraction of some larger total carrier network market), $N_c$ is the number of 7726 message complaints received for the communication address, and $N_s$ is the number of messages sent by the communication address. The carrier network market share may be configured in the traffic service-level classifier 112 or registry 108 as one of the traffic volume decision weighting factors 216. The communication address 7726 metric 222 may receive a particularly influential (e.g., large negative) weight, relative to other factors, in the weighted traffic attributes combinatorial algorithm 120.

The traffic service-level classifier 112 may comprise a communication address STOP metric 226 determined in similar fashion for STOP function messages sent by message recipients. In some embodiments the communication address STOP metric 226 may comprise an additional factor for a number of messages sent by the communication address to recipients that had activated the STOP function against the communication address. For example $$M = \frac{1}{\varepsilon} \times \frac{N_c}{N_s} + \eta N_r$$

Stop metric embodiment 1

$$M = \frac{1}{\varepsilon} \times \frac{N_c}{N_s} + \eta \frac{N_r}{N_c}$$

Stop metric embodiment 2

$$M = \frac{1}{\varepsilon} \times \frac{N_r}{N_c}$$

Stop metric embodiment 3 where $N_c$ is the number of STOP function requests against the communication address, and $N_s$ is the number of messages sent by the communication address, η is a weighting factor, and $N_r$ is a number of messages sent from the communication address to the recipient that activated the STOP function after they activate the STOP function. In some embodiments the communication address STOP metric 226 is given the highest influence in the weighted traffic attributes combinatorial algorithm 120 (e.g., a higher negative weight than the other factors). In some embodiments, the communication address STOP metric 226 is assigned highest influence and the communication address 7726 metric 222 is assigned a next highest influence in the weighted traffic attributes combinatorial algorithm 120.

Any of the metrics generated by the algorithms of the traffic service-level classifier 112 may be assigned a weighting that is enhanced or attenuated by a burst traffic normalization algorithm 218. An example where the burst traffic normalization algorithm 218 may be utilized is when a number of spam warnings are received from the spam control algorithms 124, and/or a number of STOP functions are activated, and/or a number of 7726 messages are sent in response to messages from an entity in a messaging burst that is limited in time and scope, but not does not repeat. This may indicate an aberrant message and not a pattern of ongoing unruly messaging behavior. In such cases it may not be desirable or accurate to downgrade the sending entity's class of service. The burst traffic normalization algorithm 218 may normalize for burstiness by introducing hysteresis and/or attenuation into the weighted traffic attributes combinatorial algorithm 120 so that the weighted traffic attributes combinatorial algorithm 120 does not produce an rapid and inappropriate downgrade in class of service in response to the burst.

Figure 3:
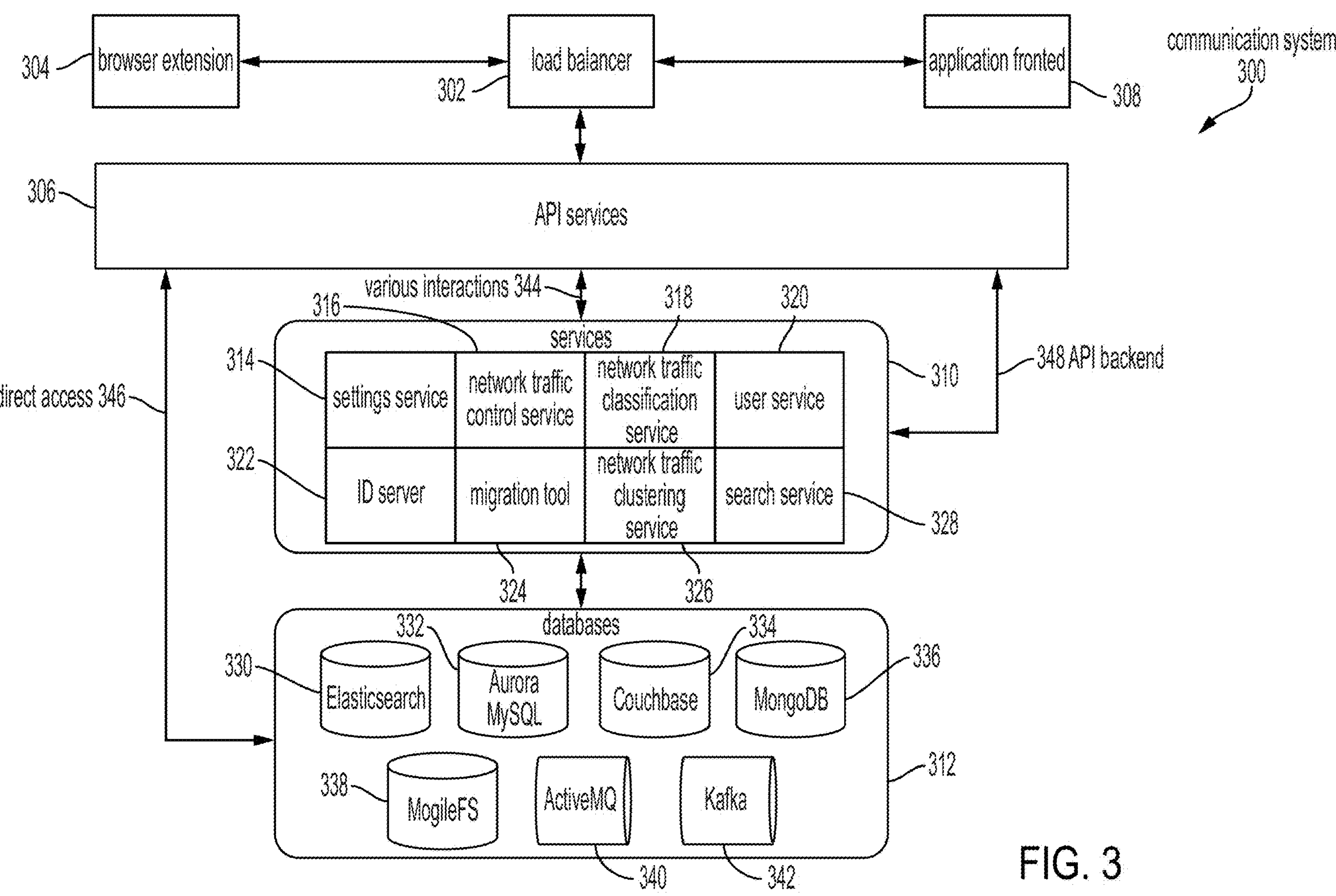
FIG. 3 depicts a communication system 300 in accordance with one embodiment.

FIG. 3 depicts a communication system 300 in accordance with one embodiment. The communication system 300 may comprise logic components that interact to provide the disclosed functionality. The communication system 300 may comprise a load balancer 302, a browser extension 304, API services 306, an application frontend 308, services 310, and databases 312.

Services 310 may comprise a settings service 314, a network traffic control service 316, a network traffic classification service 318, a user service 320, an ID server 322, a migration tool 324, a network traffic clustering service 326, and a search service 328. Databases 312 may include Elasticsearch 330, Aurora MySQL 332, Couchbase 334, MongoDB 336, MogileFS 338, or other database structures, as well as messaging/streaming platforms such as ActiveMQ 340 or Kafka 342. These services 310 and databases 312 are presented as common database implementations in the industry. One of skill in the art will recognize that these services 310 and databases 312 are not intended to limit the scope of the disclosed system.

The load balancer 302 acts to manage requests from the browser extension 304 and application frontend 308 to the API services 306, as well as responses from the API services 306 to the browser extension 304 and application frontend 308.

The browser extension 304 and application frontend 308 may provide conduits from custom or industry standard user interfaces through which messages from customers, potential customers, and business users may enter the system. The load balancer 302 may transmit these messages to the API services 306 such that the API services 306 may generate the appropriate access, query, or other commands for the various interactions 344 appropriate to the incoming messages.

The API services 306 may direct the various interactions 344 with the services 310. The API services 306 may additionally facilitate direct access 346 to the databases 312 independent of action by the services 310. The API services 306 may also use an API backend 348 to communicate with services 310 as needed.

The settings service 314 may manage settings such as configured thresholds and classifications and other settings that determine under what circumstances the network traffic control service 316 may provide or revoke access to particular functionality, for example.

The network traffic control service 316 may implement some or all of the functionality of the network traffic controller 114. The network traffic control service 316 may interact with the settings service 314 to provide this functionality under specific conditions. The network traffic classification service 318 may implement some or all of the functionality of the traffic service-level classifier 112. The user service 320 may provide specific functionality based on a user initiating interaction through the browser extension 304 and application frontend 308. The ID server 322 may manage identifying information for customers and business users that have accessed and sent messages through the system. Information may include names, company identification credentials, company affiliations, contact information, and other parameters used to identify and manage permissions and configuration settings for specific individuals or legal entities using the system.

The migration tool 324 may facilitate migration from a particular database or platform to another, as needed based on business needs, system upgrades, etc.

The network traffic clustering service 326 may implement functionality of the network traffic clustering algorithm 122. The databases 312 may store business configuration parameters, information or parameters specific to individual business users, data on customers or prospective customers who have made contact via a text enabled line, message templates, archives of incoming and outgoing messages processed by the disclosed system, etc. In some embodiments, one or more of the databases 312 implement the registry 108. The following paragraphs describe a non-limiting set of commercially available databases 312 and streaming/messaging platforms that may be used in implementing the disclosed methods and system.

Elasticsearch 330 is a well-known enterprise-level search engine based on the Lucene library. It provides a distributed, multitenant-capable full-text search engine with an HTTP web interface and schema-free JSON documents. Aurora MySQL 332 is a database technology currently provided by Amazon® Corp.

Couchbase 334 is an open-source, distributed multi-model NoSQL document-oriented database software package for interactive applications. These applications may serve many concurrent users by creating, storing, retrieving, aggregating, manipulating and presenting data. MongoDB 336 is a cross-platform document-oriented database program. Classified as a NoSQL database program, MongoDB uses JSON-like documents with optional schemas. MogileFS 338 is an open source distributed file system provided by Google® Corp.

ActiveMQ 340 is an open source message broker developed by the Apache Software Foundation written in Java together with a full Java Message Service (JMS) client. Supported clients include Java via JMS 1.1 as well as several other "cross language" clients. The communication is managed with features such as computer clustering and ability to use any database as a JMS persistence provider besides virtual memory, cache, and journal persistency.

Kafka 342 is an open-source stream-processing software platform developed by the Apache Software Foundation, written in Scala and Java. Kafka provides a unified, high-throughput, low-latency platform for handling real-time data feeds. Kafka can connect to external systems for data import/export and provides a Java stream processing library. Kafka uses a binary TCP-based protocol and a message set abstraction that groups messages together to reduce the overhead of the network roundtrip.

The communication system 300 may detect an inbound message for example at the API backend 348, which may extract a source communication address (the address of the sender of the message) from the inbound message, for example by invoking the user service 320. The communication system 300 may invoke the search service 328 and settings service 314 to compare the source communication address against a dynamic set of communication addresses accumulated in one or more of the databases 312 in a time configured interval, and on condition that the source communication address is not in the dynamic set, add the source communication address to the dynamic set, and invoke the network traffic control service 316, network traffic classification service 318, and/or network traffic clustering service 326 to carry out aspects of the processes described herein.

The communication system 300 may also detect an outbound message for example at the API backend 348, which may identify a destination communication address for the outbound message, for example by invoking the user service 320. The communication system 300 may API services 306 may utilize the search service 328 and settings service 314 to compare the destination communication address against a dynamic set of communication addresses accumulated in one or more of the databases 312 in a time configured interval, and on condition that the destination communication address is not in the dynamic set, add the destination communication address to the dynamic set.

Figure 4:
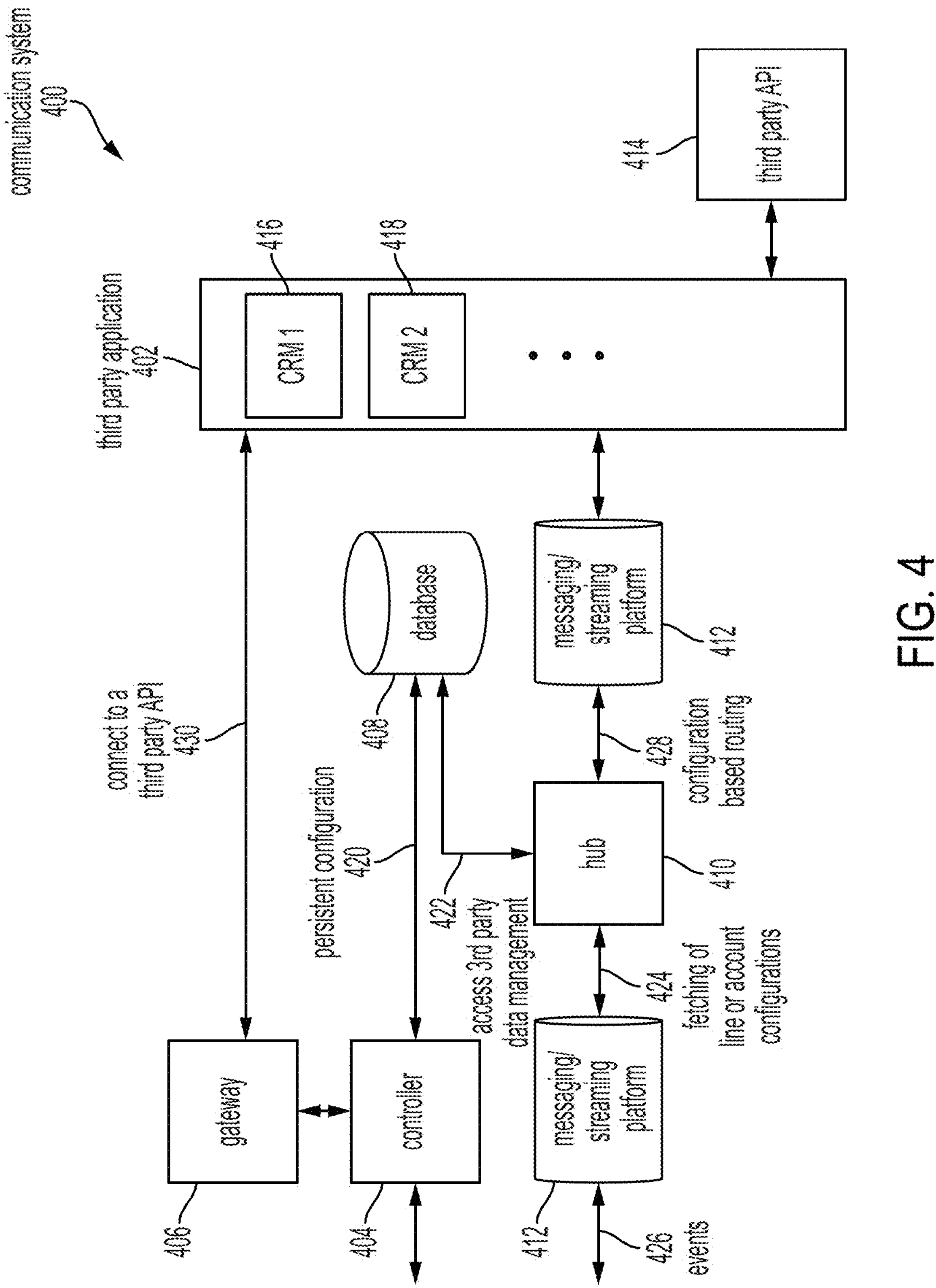
FIG. 4 depicts a communication system 400 in accordance with one embodiment.

FIG. 4 depicts a communication system 400 in accordance with one embodiment. The communication system 400 illustrated may provide integration functionality for the communication system 300 introduced in FIG. 3 that enables the communication system 300 to be integrated with third party systems in the industry, such as third party applications 402 accessed over the carrier network 102 or a wide area network such as the Internet.

The communication system 400 comprises a controller 404, a gateway 406, a database 408, a hub 410, a messaging/streaming platform 412, a third party applications 402, and a third party API 414. The third party applications 402 may comprise customer relationship management applications (e.g., a CRM 1 416 and a CRM 2 418), and other logic.

The controller 404 may be one or more processors or processing modules configured to perform or coordinate the performance of the functions needed to migrate or upgrade the system implementing the disclosed methods. The controller 404 may send persistent configuration 420 information to a database 408 in order to store configuration parameters intended to persist on the system.

The database 408 may store configuration data, archives, and other information. The database 408 may access 3rd party data management 422 through interaction with the hub 410.

The hub 410 may enable fetching of line or account configurations 424 by interfacing with the messaging/streaming platform 412 as the messaging/streaming platform 412 manages events 426 such as inbound message, outbound messages, contact add/update line events, and other actions. The hub 410 may also interact with the messaging/streaming platform 412 via configuration based routing 428 in order to communicate with the third party applications 402.

The gateway 406 may interact with the controller 404 to manage, control, and/or direct interactions between the system. The gateway 406 may connect to a third party API 430 available through third party applications 402.

Third party applications 402 may interact with the gateway 406 and the third party API 414. The third party applications 402 may enable the gateway 406 to connect to a third party API 430 during migration and upgrade activities, for example.

Software Implementations

The systems disclosed herein, or particular components thereof, may in some embodiments be implemented as software comprising instructions executed on one or more programmable device. By way of example, components of the disclosed systems may be implemented as an application, an app, drivers, and services. Components of the system may be implemented as services that execute as one or more processes, modules, subroutines, or tasks on a server device so as to provide the described capabilities to one or more client devices over a combination of the Internet and carrier networks. The system may also include one or more app or applications on a mobile device and/or a laptop, desktop, or tablet computer.

Figure 5:
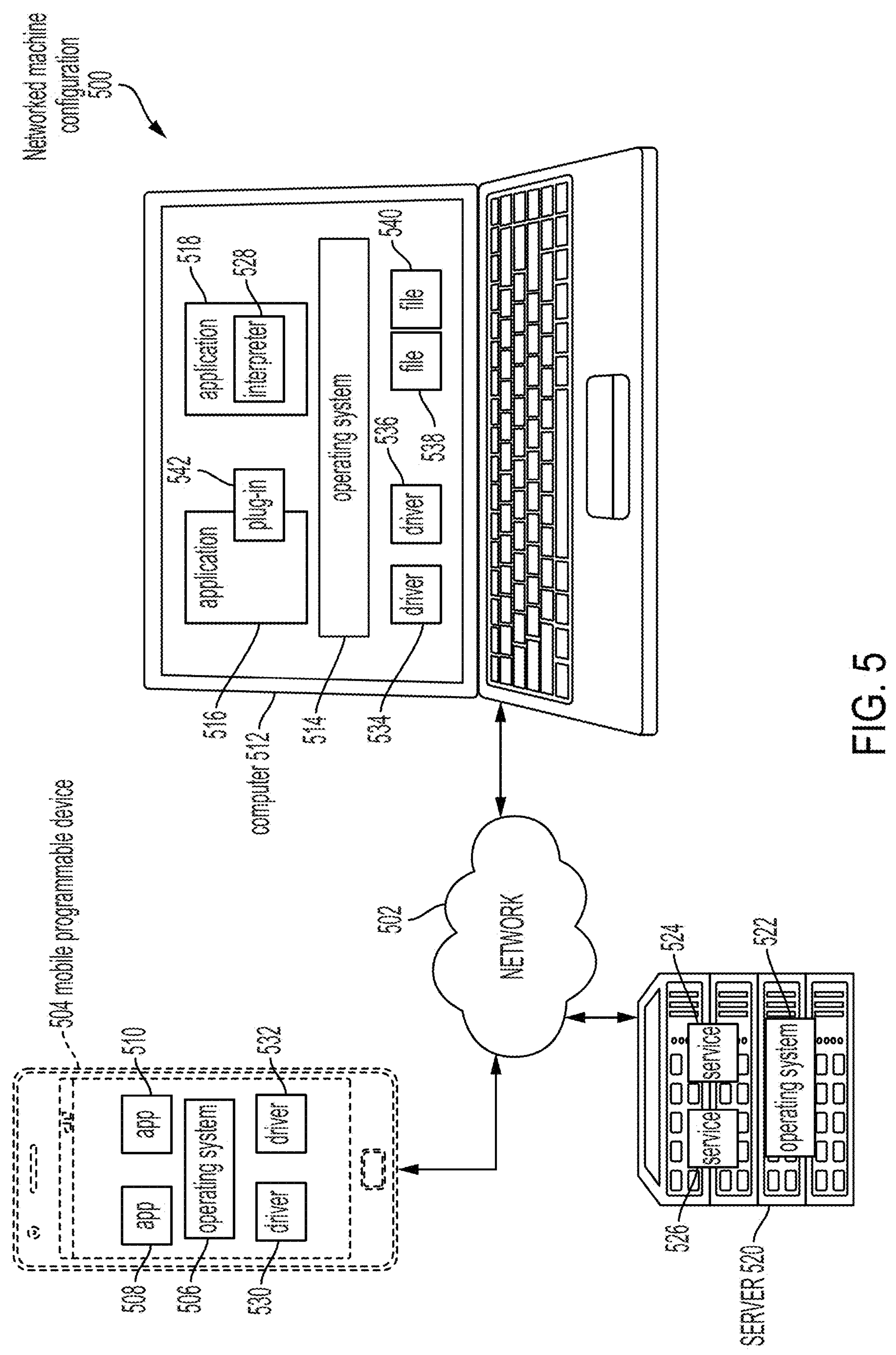
FIG. 5 depicts a networked machine configuration 500 in accordance with one embodiment.

Referring to FIG. 5, a networked machine configuration 500 depicts various computer hardware devices and software modules coupled by a network 502 in one embodiment. Each device includes a native operating system, typically pre-installed on its non-volatile RAM, and a variety of software applications or apps for performing various functions.

The mobile programmable device 504 comprises a native operating system 506 and various apps (e.g., app 508 and app 510). A computer 512 also includes an operating system 514 that may include one or more library of native routines to run executable software on that device. The computer 512 also includes various executable applications (e.g., application 516 and application 518). The mobile programmable device 504 and computer 512 are configured as clients on the network 502. A server 520 is also provided and includes an operating system 522 with native routines specific to providing a service (e.g., service 524 and service 526) available to the networked clients in this configuration.

In one embodiment, an app or application on a mobile device such as a cell phone may be utilized for sending outbound messages and receiving inbound messages that are processed by services of a network server to implement aspects of the processes described herein.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 512, mobile programmable device 504, and/or server 520. Any of these devices may employ a loader to place the executable and any associated library in memory for execution. The operating system executes the program by passing control to the loaded program code, creating a task or process. An alternate means of executing an application or app involves the use of an interpreter (e.g., interpreter 528).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 530 or driver 532 on the mobile programmable device 504 or computer 512 (e.g., driver 534 and driver 536) might enable wireless headphones to be used for audio output(s) and a camera to be used for video inputs. Any of the devices may read and write data from and to files (e.g., file 538 or file 540) and applications or apps may utilize one or more plug-in (e.g., plug-in 542) to extend their capabilities (e.g., to encode or decode video files).

The network 502 in the networked machine configuration 500 can be of a type understood by those skilled in the art, including a Local Area Network (LAN), Wide Area Network (WAN), Transmission Communication Protocol/Internet Protocol (TCP/IP) network, and so forth. These protocols used by the network 502 dictate the mechanisms by which data is exchanged between devices.

Machine Embodiments

Figure 6:
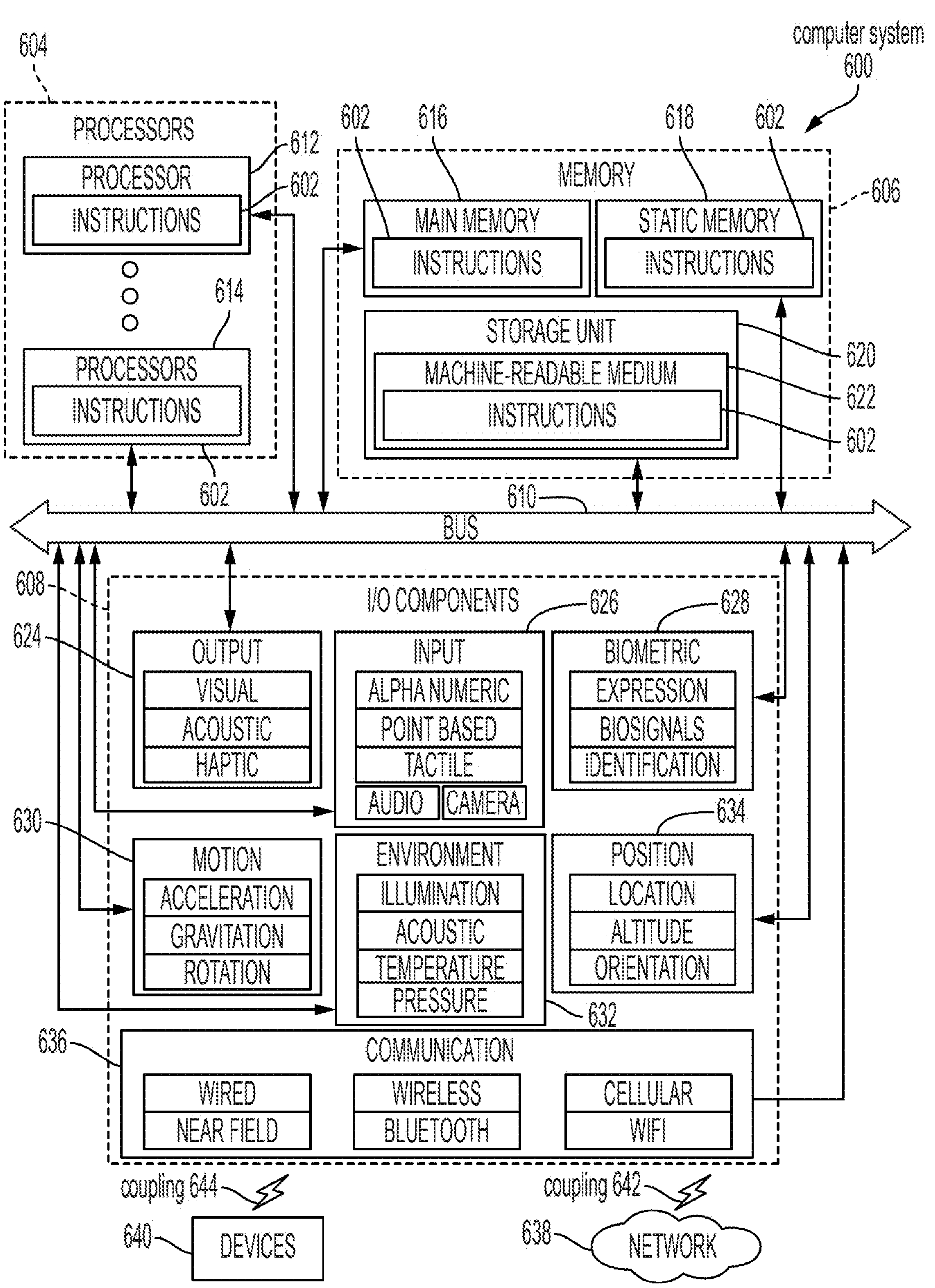
FIG. 6 depicts a diagrammatic representation of a computer system 600 within which a set of instructions may be executed for causing the machine to perform any one or more of the methodologies discussed herein, according to an example embodiment.

FIG. 6 depicts a diagrammatic representation of a computer system 600 in the form of a computer system within which logic may be implemented to cause the machine to perform any one or more of the methodologies disclosed herein, according to an example embodiment.

Specifically, FIG. 6 depicts a computer system 600 comprising instructions 602 (e.g., a program, an application, an applet, an app, or other executable code) for causing the computer system 600 to perform any one or more of the functions or methods discussed herein. For example the instructions 602 may cause the computer system 600 to carry out aspects of the processes described herein. The instructions 602 configure a general, non-programmed machine into a particular computer system 600 programmed to carry out said functions and/or methods.

In alternative embodiments, the computer system 600 operates as a standalone device or may be coupled (e.g., networked) to other machines. In a networked deployment, the computer system 600 may operate in the capacity of a server machine or a client machine in a server-client network environment, or as a peer machine in a peer-to-peer (or distributed) network environment. The computer system 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 602, sequentially or otherwise, that specify actions to be taken by the computer system 600. Further, while only a single computer system 600 is depicted, the term "machine" shall also be taken to include a collection of machines that individually or jointly execute the instructions 602 to perform any one or more of the methodologies or subsets thereof discussed herein.

The computer system 600 may include processors 604, memory 606, and I/O components 608, which may be configured to communicate with each other such as via one or more bus 610. In an example embodiment, the processors 604 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 612 and processor 614) to execute the instructions 602. The term "processor" is intended to include multi-core processors that may comprise two or more independent processors (sometimes referred to as "cores") that may execute instructions contemporaneously. Although FIG. 6 depicts multiple processors 604, the computer system 600 may include a single processor with a single core, a single processor with multiple cores (e.g., a multi-core processor), multiple processors with a single core, multiple processors with multiples cores, or any combination thereof.

The memory 606 may include one or more of a main memory 616, a static memory 618, and a storage unit 620, each accessible to the processors 604 such as via the bus 610. The main memory 616, the static memory 618, and storage unit 620 may be utilized, individually or in combination, to store the instructions 602 embodying any one or more of the functionality described herein. The instructions 602 may reside, completely or partially, within the main memory 616, within the static memory 618, within a machine-readable medium 622 within the storage unit 620, within at least one of the processors 604 (e.g., within the processor's cache memory), or any suitable combination thereof, during execution thereof by the computer system 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones will likely include a touch input device or other such input mechanisms, while a headless server machine will likely not include such a touch input device. It will be appreciated that the I/O components 608 may include many other components that are not shown in FIG. 6. The I/O components 608 are grouped according to functionality merely for simplifying the following discussion and the grouping is in no way limiting. In various example embodiments, the I/O components 608 may include output components 624 and input components 626. The output components 624 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 608 may include biometric components 628, motion components 630, environmental components 632, or position components 634, among a wide array of possibilities. For example, the biometric components 628 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 may include acceleration sensor components (e.g., accelerometer), gravitation sensor components, rotation sensor components (e.g., gyroscope), and so forth. The environmental components 632 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 634 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 may include communication components 636 operable to couple the computer system 600 to a network 638 or devices 640 via a coupling 642 and a coupling 644, respectively. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 606, main memory 616, static memory 618, and/or memory of the processors 604) and/or storage unit 620 may store one or more sets of instructions and data structures (e.g., software) embodying or utilized by any one or more of the methodologies or functions described herein. These instructions (e.g., the instructions 602), when executed by processors 604, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 638 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 638 or a portion of the network 638 may include a wireless or cellular network, and the coupling 642 may be a Code Division Multiple Access (CDMA) connection, a Global System for Mobile communications (GSM) connection, or another type of cellular or wireless coupling. In this example, the coupling 642 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 602 and/or data generated by or received and processed by the instructions 602 may be transmitted or received over the network 638 using a transmission medium via a network interface device (e.g., a network interface component included in the communication components 636) and utilizing any one of a number of well-known transfer protocols (e.g., hypertext transfer protocol (HTTP)). Similarly, the instructions 602 may be transmitted or received using a transmission medium via the coupling 644 (e.g., a peer-to-peer coupling) to the devices 640. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 602 for execution by the computer system 600, and/or data generated by execution of the instructions 602, and/or data to be operated on during execution of the instructions 602, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

100 network traffic control system
102 carrier network
104 private network
106 network traffic monitor
108 registry
110 message repository
112 traffic service-level classifier
114 network traffic controller
116 message queue
118 message router
120 weighted traffic attributes combinatorial algorithm
122 network traffic clustering algorithm
124 spam control algorithm
126 congestion controller
128 access controller
202 reactive address verification process
204 communication address
206 message
208 Uniform Resource Locator
210 redirect hop count
212 redirect chain
214 machine learning model
216 traffic volume decision weighting factors
218 burst traffic normalization algorithm
220 carrier-based 7726 count normalization
222 communication address 7726 metric
224 combinatorial weight tuning
226 communication address STOP metric
228 content cross-correlation algorithm
230 cross-correlation threshold
232 content matching signature algorithm
234 content semantic pattern analysis algorithm
236 elevated blocking threshold 238 regression address mapping
240 reverse DNS lookup
242 traffic service-level classification
244 cluster metric
246 communication address BLOCK
248 partial communication address BLOCK
250 STOP function
252 RE-OPT-IN function
254 functional unlock
256 activation signal
258 spam filter stack rollback
260 message queue reprioritization
300 communication system
302 load balancer
304 browser extension
306 API services
308 application frontend
310 services
312 databases
314 settings service
316 network traffic control service
318 network traffic classification service
320 user service
322 ID server
324 migration tool
326 network traffic clustering service
328 search service
330 Elasticsearch
332 Aurora MySQL
334 Couchbase
336 MongoDB
338 MogileFS
340 ActiveMQ
342 Kafka
344 various interactions
346 direct access
348 API backend
400 communication system 402 third party applications 404 controller
406 gateway
408 database
410 hub
412 messaging/streaming platform 414 third party API
416 CRM 1
418 CRM 2
420 persistent configuration
422 access 3rd party data management
424 fetching of line or account configurations
426 events
428 configuration based routing
430 connect to a third party API
500 networked machine configuration
502 network
504 mobile programmable device
506 operating system
508 app
510 app
512 computer
514 operating system
516 application
518 application
520 server
522 operating system
524 service
526 service
528 interpreter
530 driver
532 driver
534 driver
536 driver
538 file
540 file
542 plug-in
600 computer system
602 instructions
604 processors
606 memory
608 I/O components
610 bus
612 processor
614 processor
616 main memory
618 static memory
620 storage unit
622 machine-readable medium
624 output components
626 input components
628 biometric components
630 motion components
632 environmental components
634 position components
636 communication components
638 network
640 devices
642 coupling
644 coupling "Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Configured interval" refers to a time interval configured persistently in the system and prior to the actions or events that trigger transmission of the pre-defined outbound message.

"Driver" refers to low-level logic, typically software, that controls components of a device. Drivers often control the interface between an operating system or application and input/output components or peripherals of a device, for example.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine language" refers to instructions in a form that is directly executable by a programmable device without further translation by a compiler, interpreter, or assembler. In digital devices, machine language instructions are typically sequences of ones and zeros.

"Module" refers to a computer code section having defined entry and exit points. Examples of modules are any software comprising an application program interface, drivers, libraries, functions, and subroutines.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Plug-in" refers to software that adds features to an existing computer program without rebuilding (e.g., changing or re-compiling) the computer program. Plug-ins are commonly used for example with Internet browser applications.

"Pre-defined outbound message" refers to an outbound message configured into the system persistently and prior to the actions or events that trigger transmission of the pre-defined outbound message.

"Process" refers to software that is in the process of being executed on a device.

"Programmable device" refers to any logic (including hardware and software logic) who's operational behavior is configurable with instructions.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 1 18 (f) for that claim element. Accordingly, claims in this application that do not otherwise include the "means for" [performing a function] construct should not be interpreted under 35 U.S.C § 1 18 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method, comprising:

receiving, by one or more processors, a message associated with a communication address of a party originating the message;

determining a class of service associated with the communication address;

identifying, among a plurality of message queues, a message queue associated with the communication address;

responsive to validating the communication address, elevating a priority of the identified message queue; and assigning the message to the identified message queue.

2. The method of claim 1, further comprising:

adjusting an aggression level of a spam filter with respect to messages originated from the communication address.

3. The method of claim 1, wherein determining the class of service is performed based on one or more attributes of the message.

4. The method of claim 1, wherein determining the class of service is performed based on one or more metrics of network traffic.

5. The method of claim 1, wherein determining the class of service further comprises:

performing semantic pattern analysis of the message.

6. The method of claim 1, wherein determining the class of service further comprises:

comparing the message with another message received from a verified communication address.

7. A system, comprising:

a memory; and one or more processors, coupled to the memory, the one or more processors configured to:

receive a message associated with a communication address of a party originating the message;

determine a class of service associated with the communication address;

identify, among a plurality of message queues, a message queue associated with the communication address;

responsive to validating the communication address, elevate a priority of the identified message queue; and assign the message to the identified message queue.

8. The system of claim 7, wherein the one or more processors are further configured to:

adjust an aggression level of a spam filter with respect to messages originated from the communication address.

9. The system of claim 7, wherein determining the class of service is performed based on one or more attributes of the message.

10. The system of claim 7, wherein determining the class of service is performed based on one or more metrics of network traffic.

11. The system of claim 7, wherein determining the class of service further comprises:

performing semantic pattern analysis of the message.

12. The system of claim 7, wherein determining the class of service further comprises:

comparing the message with another message received from a verified communication address.

13. A non-transitory computer-readable storage medium comprising executable instructions which, when executed by one or more processors, cause the one or more processors to:

receive a message associated with a communication address of a party originating the message;

determine a class of service associated with the communication address;

identify, among a plurality of message queues, a message queue associated with the communication address;

responsive to validating the communication address, elevate a priority of the identified message queue; and assign the message to the identified message queue.

14. The non-transitory computer-readable storage medium of claim 13, further comprising executable instructions which, when executed by the one or more processors, cause the one or more processors to:

adjust an aggression level of a spam filter with respect to messages originated from the communication address.

15. The non-transitory computer-readable storage medium of claim 13, wherein determining the class of service is performed based on one or more attributes of the message.

16. The non-transitory computer-readable storage medium of claim 13, wherein determining the class of service is performed based on one or more metrics of network traffic.

17. The non-transitory computer-readable storage medium of claim 13, wherein determining the class of service further comprises:

performing semantic pattern analysis of the message.

* * * * *